(12) United States Patent
Yamaguchi (10) Patent No.: US 7,292,379 B2
(45) Date of Patent: *Nov. 6, 2007

(54) IMAGE READER AND IMAGE READING METHOD

(75) Inventor: Hiroshi Yamaguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1014 days.

This patent is subject to a terminal disclaimer.

(21) Appl. No.: 10/229,278

(22) Filed: Aug. 28, 2002

(65) Prior Publication Data

US 2003/0076416 A1    Apr. 24, 2003

(30) Foreign Application Priority Data

Aug. 28, 2001 (JP) ............................. 2001-257388

(51) Int. Cl.
*G03F 3/08* (2006.01)
(52) U.S. Cl. .................... 358/518; 358/1.9; 358/505; 382/96; 382/254
(58) Field of Classification Search ............... 358/1.9, 358/518, 505; 382/112, 254, 96
See application file for complete search history.

(56) References Cited

U.S. PATENT DOCUMENTS

| | | | |
|---|---|---|---|
| 5,736,304 A * | 4/1998 | Rider et al. .................. | 430/398 |
| 6,075,590 A | 6/2000 | Edgar | |
| 6,274,299 B1 * | 8/2001 | Buhr et al. .................. | 430/359 |
| 6,771,833 B1 * | 8/2004 | Edgar .......................... | 382/254 |
| 7,035,437 B2 * | 4/2006 | Yamaguchi ................ | 382/112 |
| 2001/0052932 A1 * | 12/2001 | Young et al. ................ | 348/96 |

FOREIGN PATENT DOCUMENTS

| | | |
|---|---|---|
| EP | 0 660 591 A2 | 6/1995 |
| EP | 1 263 206 A2 | 12/2002 |
| WO | WO 98/31142 A1 | 7/1998 |

* cited by examiner

*Primary Examiner*—Kimberly Williams
*Assistant Examiner*—Michael Burleson
(74) *Attorney, Agent, or Firm*—Sughrue Mion Pllc.

(57) ABSTRACT

The image reader reads photoelectrically an original image including a visible image and an invisible image. The image reader includes an image reading device for reading said original image with visible light and invisible light and a detecting unit which generates correlational pixel distribution information based on visible light signals and invisible light signals read by the image reading device and detects noise components in the original image by use of said pixel distribution information. The image reading method shortens time to perform processing for washing off silver components remaining in a film upon developing an original image on the film and eliminates an influence of residual silver components remaining in an original image on a developed film by image signal processing subsequent to reading of the original image on the developed film.

9 Claims, 4 Drawing Sheets

IMAGE READER AND IMAGE READING METHOD

BACKGROUND OF THE INVENTION

1. Field of the Invention

The present invention relates generally to an image reader for photoelectrically reading an original image or the like recorded on an image recording medium such as a film, and more particularly to an image reader and an image reading method capable of preventing an adverse influence of noise components including silver components by detecting the noise components remaining in an image recording medium such as a film.

2. Description of the Related Art

Nowadays, a so-called direct exposure, in which a film image is exposed by projecting light onto a photosensitive material, is a major method for printing onto the photosensitive material (photographic printing paper) the image recorded on a photographic film (which will hereinafter be simply called a film) such as a negative film and a reversal film.

Further, a digital photoprinter has been utilized over the recent years, in which the image recorded on the film is photoelectrically read; the read-out image has been converted into digital signals; image data for recording are thereafter obtained by effecting a variety of image processing operations; a photosensitive material is exposed to recording beams modulated in accordance with the image data to obtain a print; and the print is then outputted.

According to the thus constructed digital photoprinter, the image recorded on the film is read, and the digital image data undergo the image processing. It is therefore possible to highly preferably correct color and density thereof and further obtain a high-quality image by executing the image processing such as gradation correction and sharpness enhancement (sharpness correction), which cannot be basically implemented by direct-exposure type normal printers.

Moreover, the digital photoprinter outputs the print and, in addition, outputs (stores) the image data as an image file onto a recording medium such as a CD-R, HD (hard disk) and so on.

By the way, what is known as one factor of a quality decline of the print image in those photoprinters is silver components remaining in the image (which will hereinafter be called residual silver) on the developed (silver halide photographic) film.

A so-called color film is basically designed to remove all the existing silver components by bleaching and fixing executed after coloring/development.

If the processing is not properly executed due to deterioration of a processing liquid and in terms of temperature control, however, the silver components cannot be completely removed because of an occurrence of defect in the bleaching and fixing operations, with a result that the residual silver stays therein.

If the residual silver exists in the image, a variety of declines of image quality arise, in which a gradation of a high-density portion (highlight on the print) becomes hard, a saturation decreases, and so forth.

Accordingly, a production of the print with the high-quality image reproduced involves eliminating an adverse influence caused by the residual silver. Under the present conditions, however, there is no alternative effective method but to prevent the residual silver from remaining in the image by properly managing the bleaching and fixing operations in developing the film.

In addition to an image-forming intermediate product in an image recording medium, including residual silver remaining in a film, an impurity remaining in an image recording medium may induce declines of image quality. In order to avoid such declines of image quality, there is no alternative effective method but to prevent the impurity from remaining in the image as is the case with residual silver.

SUMMARY OF THE INVENTION

It is a primary object of the present invention, which was devised to obviate the problems inherent in the prior art described above, to provide an image reader and an image reading method for photoelectrically reading an original image etc. photographed or recorded on an image recording medium such as a (photographic) film, the image reader and the image reading method being capable of properly detecting unwanted (signal) components other than image components, that are caused by either an image-forming intermediate product such as residual silver or an impurity or the both remaining in an original image recorded on an image recording medium including a silver halide photosensitive material such as a film and photographic printing paper, or even capable of correcting by image processing a decline of image quality due to the unwanted (signal) components such as residual silver and, as a consequence, shortening developing time to develop a silver halide photosensitive material such as a film and photographic printing paper, allowing certain margin for the processing conditions for a developing device, advantageously managing the developing device, and the like.

In order to attain the object described above, the present invention is to provide an image reader photoelectrically reading an original image including a visible image and an invisible image, comprising an image reading device for reading the original image with visible light and invisible light and a detecting unit which generates correlational pixel distribution information based on visible light signals and invisible light signals read by the image reading device and detects noise components in the original image by use of the pixel distribution information Preferably, the noise components are unwanted components other than image components in the original image which are caused by either an image-forming intermediate product or an impurity or both in an image recording medium carrying the original image thereon, and preferably, the unwanted components are silver components remaining in the original image.

Further, it is preferable that the image reading device reads the visible image of the original image by reading the visible light in three primary colors of red, green and blue, and the detecting unit generates the pixel distribution information by use of weighted visible light signals obtained by performing a weighting operation in which predetermined weighting is carried out with respect to each of the three primary colors of red, green and blue, and that the weighted visible light signals are obtained by performing the weighting operation with decreasing weight in order of red, green and blue of the three primary colors.

In addition, the present invention is to provide the above described image reader further comprising a correcting unit which generates correction information with the visible light signals as parameters in accordance with the noise components detected by the detecting unit and corrects the visible light signals read by the image reading device with an aid of the correction information.

Preferably, the correcting unit corrects the visible light signals such that change in gradation or color reproducibility or both due to the noise components are compensated by image signal processing or such that an intensity of graininess suppression upon image signal processing is modified in order to compensate change in graininess due to the noise components.

Further, it is preferable that the correcting unit generates the correction information on a basis of the invisible light signals exhibiting a minimum density in an aggregation of pixels which are identical to one another in the visible light signals relating to them.

And, the present invention is to provide the image reader further comprising an alarming device for giving an alarm when a quantity of the noise components detected by the detecting unit exceeds a predetermined value.

Furthermore, in order to attain the above-mentioned object, the present invention is to provide an image reading method comprising shortening time to perform processing for washing off silver components remaining in a film upon developing an original image on the film and eliminating an influence of residual silver components remaining in an original image on a developed film by image signal processing subsequent to reading of the original image on the developed film.

DESCRIPTION OF THE PREFERRED EMBODIMENT

The image reader and the image reading method according to the present invention will hereinafter be described in detail with reference to preferred embodiments shown in the accompanying drawings.

Figure 1:
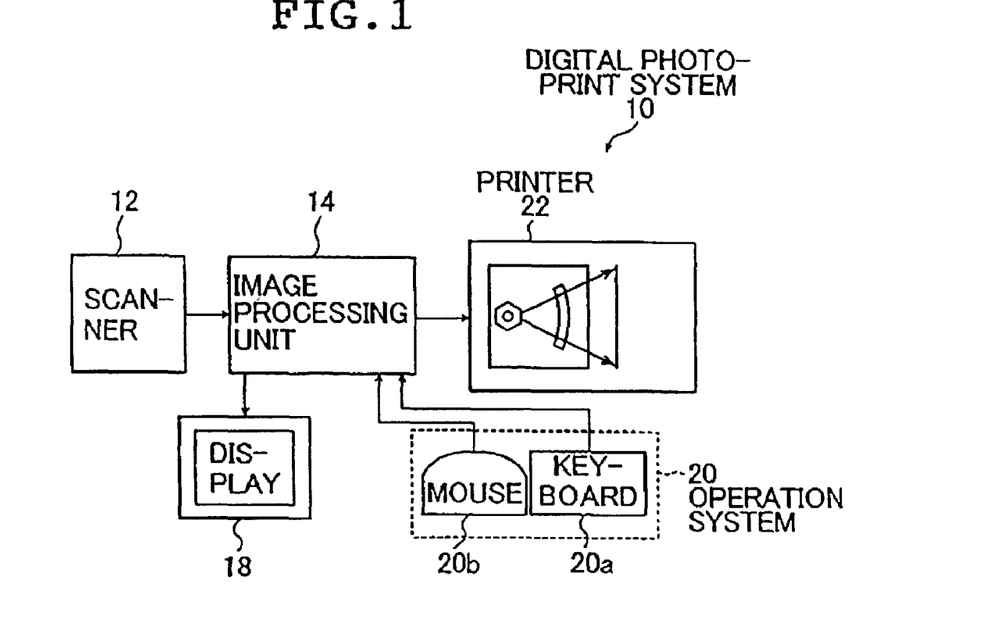
FIG. 1 is a block diagram showing one embodiment of a digital photoprint system utilizing an image reader according to the present invention.

FIG. 1 is a block diagram showing one embodiment of a digital photoprint system utilizing an image reader of the present invention.

A digital photoprint system (hereinafter simply called the print system) 10 depicted in FIG. 1 photoelectrically reads an image recorded on a (photographic) film F and outputs the thus read image as a (photographic) print. The digital photoprint system basically comprises a scanner 12, an image processing unit 14, a display 18, an operation system 20 (a keyboard 20*a* and a mouse 20*b*), and a printer 22.

Figure 2:
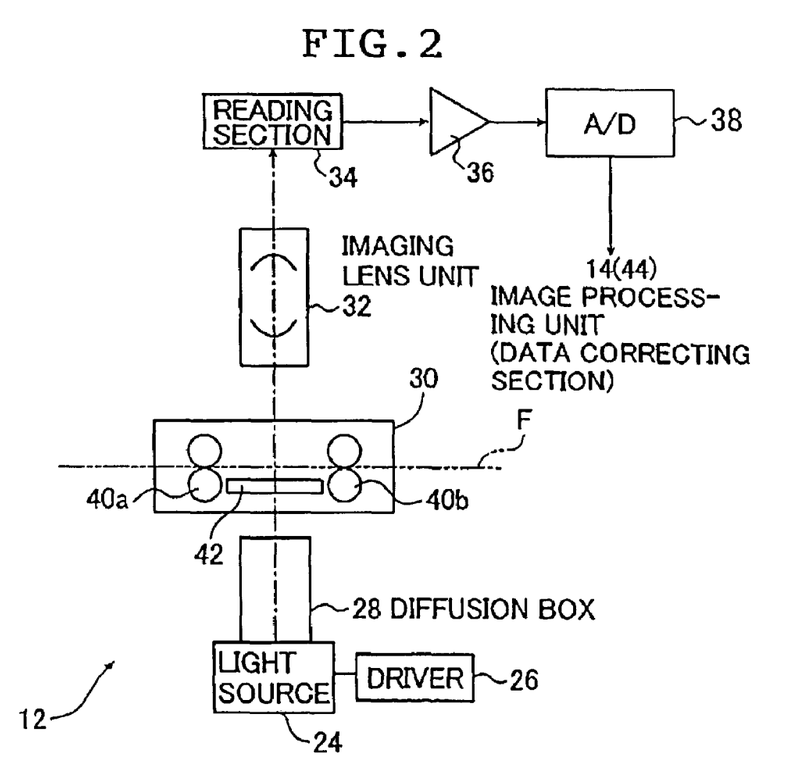
FIG. 2 is a conceptual diagram showing a scanner of the digital photoprint system illustrated in FIG. 1.

FIG. 2 is a conceptual diagram of the scanner 12 shown in FIG. 1. The scanner 12 is a device that photoelectrically reads an image recorded on each of frames of the film F. The scanner 12 includes, as shown in FIG. 2, a light source 24, a driver 26, a diffusion box 28, a carrier 30, an imaging lens unit 32, a reading section 34, an amplifier 36 and an A/D (analog-to-digital) converter 38.

The light source 24 of the scanner 12 in this illustrative embodiment involves use of LEDs (Light Emitting Diodes). The light source 24 is constructed of an array of LEDs such as three types of LEDs emitting visible light for R (red), G (green) and B (blue), respectively, and an LED that emits invisible IR (infrared) light. The thus constructed light source 24 is driven by the driver 26, whereby the visible light and the IR light are emitted in sequence.

The diffusion box 28 serves to diffuse the light from the light source 24 to make incident light upon the film F uniform in the direction across the film F.

The carrier 30 intermittently carries the film F so that respective images recorded on the film F (respective frames) can be sequentially carried to and held in a predetermined reading position. Plural types of carriers 30 are prepared corresponding to film sizes, etc. and detachably attached to a body of the scanner 12.

In the illustrative example, the carrier 30 has a couple of carrier rollers 40*a*, 40*b* that are disposed to oppose with respect to the reading position and that carry the film F in a longitudinal direction, and a mask 42 that defines a reading area of each frame in the predetermined reading position.

The imaging lens unit 32 focuses projected light from the film F to form an image in a predetermined position on the reading section 34.

The reading section 34, which photoelectrically reads the image recorded on the film F, reads the whole image of one frame defined by the mask 42 of the carrier 30 (image reading based on planar exposure) with an area CCD sensor.

When the thus configured scanner 12 reads the image on the film F, to start with, the carrier 30 carries the film F so that the frame (which is normally a first or final frame) to be read is moved to the reading position.

Next, under the action of the driver 26, for instance, the LED for R in the light source 24 is driven to emit R-light. The R-light, after its light quantity has been uniformed by the diffusion box 28 in the direction across the film F, impinges on the frame held in the reading position and passes therethrough to provide projected light bearing the image recorded on this frame. The imaging lens unit 32 images the projected light in the predetermined position of the reading section 34 (on a light receiving surface of the area CCD sensor), thereby photoelectrically reading an R-image of this frame.

Similarly, the LEDs for G and B in the light source 24 sequentially emit G- and B-light, and G- and B-images of this frame are read. Finally, the LED for IR in the light source 24 emits IR light, and an IR-image of the IR light is read. The reading of the images of this frame is thus finished. Accordingly, the scanner 12 outputs 4-channel image data including image data (visible light signals) of the respective R, G and B visible images and image data (invisible light signals) of the IR-image (invisible image).

Upon finishing the 1-frame image reading, the carrier 30 further carries the film F so that a frame to be read next is moved to the reading position.

The output data from the reading section 34 is amplified by the amplifier 36, then converted into digital data by the A/D converter 38, and outputted to the image processing unit 14 (a data correcting section 44).

According to the present invention, the image reading unit is not limited to the scanner 12 in the illustrative embodiment. For example, a scheme may also be possible in which not the 4-color LEDs but a white light source such as a halogen lamp is used, and a mechanism for inserting R-, G-, B- and IR-filters is provided upstream of the diffusion box 28, whereby the images recorded on the film are read on the same 4-channel basis. The alternative scheme is that a so-called slit scan involving the use of the white light source and a 4-line CCD sensor for reading the R- G-, B- and IR-images, is utilized for reading the images recorded on the film on the same 4-channel basis.

The print system 10 usually executes the image reading twice for one frame, i.e., a fine scan for reading images with a high resolution in order to output a print etc. and a pre-scan, performed before the fine scan, for reading images with a low resolution in order to determine fine scan reading conditions and image processing conditions in the image processing unit 14.

On this occasion, the output signals in the pre-scan and the fine scan are basically the same data except that the resolutions and output levels are different.

Figure 3:
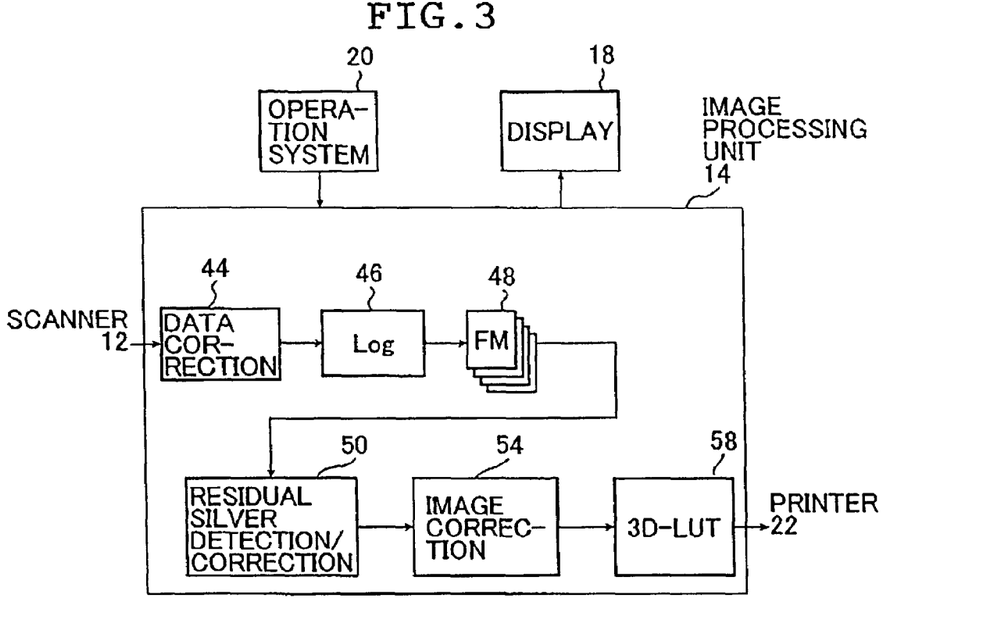
FIG. 3 is a block diagram showing an image processing unit of the digital photoprint system shown in FIG. 1.

As discussed above, the digital image signals outputted from the scanner 12 are outputted to the image processing unit 14. FIG. 3 is a block diagram showing the image processing unit 14.

As shown in FIG. 3, the image processing unit 14 includes a data correcting section 44, a Log converter 46, frame memories (which will hereinafter be abbreviated to FMs) 48, a residual silver detecting/correcting section 50, an image correcting section 54 and a data converting section (3D-LUT) 58.

Although not shown, the image processing unit 14 of the print system 10 is branched downstream in the direction of a data flow (hereinafter simply called "downstream") from the Log converter 46 to have basically similar processing route to FMs 48 through the data converting section 58 in order to process pre-scan data and display a test simulation image on the display 20. Note that this processing route may or may not contain the residual silver detecting/correcting section 50.

The data correcting section 44 subjects each of R-, G-, B- and IR-image data outputted from the scanner 12 to predetermined corrections such as DC offset correction, dark current correction or shading correction.

The Log converter 46 subjects the data processed by the data correcting section 44 to logarithmic conversion with an LUT (lookup table) for example to thereby obtain digital image (density) data.

The respective R-, G-, B- and IR-image data converted by the Log converter 46 are stored in their corresponding FMs 48.

The image data stored in the FMs 48 are processed in the residual silver detecting/correcting section 50.

The residual silver detecting/correcting section 50 detects residual silver (silver components remaining) in the images recorded on the film F by use of image data of the respective visible images of R, G and B three primary colors (hereinafter simply referred to as visible image data) and the IR-image (invisible image) data (hereinafter simply called IR data). Further, the residual silver detecting/correcting section 50 corrects as required each visible image data in such a way that the detected residual silver is removed and, if the residual silver exceeds a predetermined quantity, optionally gives an alarm indicating this.

The film F on which the image is formed through the silver-halide photography is basically designed to remove all the existing silver components by bleaching and fixing performed after the coloring/development. When deterioration in the processing liquid used or various other factors cause a failure in the bleaching, however, unwanted components including intermediate products during image formation such as residual silver and impurities, in other words, noise components remain in the image (film F). Due to these noise components, there occur, as explained above, various drawbacks including the deterioration of the gradation and color reproducibility. To be more specific, gradation hardness is increased in high-density portions, saturation is decreased and graininess is deteriorated, that is, image remains grainy.

Further, the study made by the present inventor shows that the noise components such as the residual silver and impurities often remains in a high-density portion (a high luminance part of a photographed scene) more than in low through intermediate density areas, in accordance with a limit of the processing liquid in the case of a negative film.

There is a high possibility that adverse influences such as the deterioration in the gradation, color reproducibility and graininess as exemplified by increased gradation hardness in high-density portions and decrease in the saturation due to the residual silver can be corrected by image processing, as far as the noise components such as the residual silver and impurities in the image can be properly detected from the digital image data photoelectrically read.

As a result of intensive studies conducted on the method of detecting the noise components such as the residual silver in the image, the inventor has found that the invisible light such as the IR light is not absorbed by the image (more specifically by image-forming dyes) but absorbed by the residual silver or other noise components, and that, by utilizing this phenomenon, the residual silver or other noise components in the image can be properly detected from a correlational pixel distribution between the photoelectrically read visible image and the invisible image. In the following description, the residual silver is referred to as a typical example of the noise components. However, this is not the sole example of the present invention.

FIGS. 4A-4D show one example showing a correlation between the densities (image data) of the visible images and the density (image data) of the IR image in each pixel of a given image, respectively.

Figure 4A:
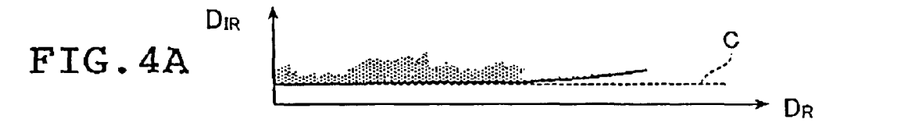
FIGS. 4A, 4B, 4C and 4D are explanatory graphs each showing how residual silver is detected according to the present invention.
Figure 4B:
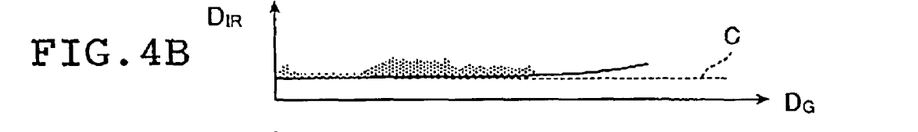
Figure 4C:
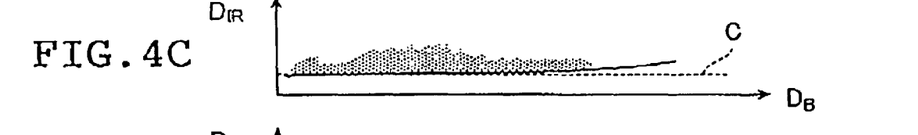

Note that FIG. 4A shows a correlation between R-density ($D_R$) and IR-density ($D_{IR}$), FIG. 4B shows a correlation between G-density ($D_G$) and IR-density ($D_{IR}$), and FIG. 4C shows a correlation between B-density ($D_B$) and IR-density ($D_{IR}$), respectively.

Figure 4D:
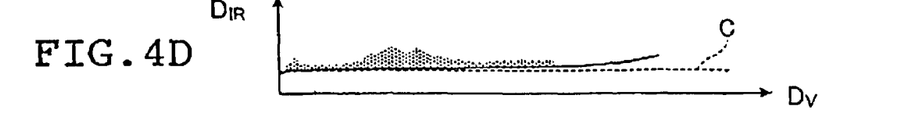

Further, FIG. 4D shows a correlation between IR-density ($D_{IR}$) and overall density ($D_V$) of a visible image as a full-color image containing all the visible R-, G- and B-images.

Note that a method of calculating the overall density $D_V$ is not particularly limited and a variety of calculation methods utilized for the image processing are available. For example, the density $D_V$ may be calculated by means of weighting using the following equation:

$$D_V = \alpha D_R + \beta D_G + \gamma D_B$$

where $\alpha$, $\beta$ and $\gamma$ are weighting coefficients. These coefficients may be appropriately determined depending on the characteristics of the system and the type of film. However, when the film F is a negative film, usually an R sensitive layer is disposed undermost, while a B sensitive layer is disposed uppermost. Hence, when taking into consideration a silver component cleansing characteristic based on the layer structure, it is preferable that $\alpha$ is larger than $\beta$, which in turn is larger than $\gamma$, that is, the relationship of $\alpha > \beta > \gamma$ be established therebetween.

As shown in FIGS. 4A-4D, a minimum line of the IR density ($D_{IR}$) rises on the high-density side in any of the visible image densities including R-density ($D_R$), G-density ($D_G$), B-density ($D_B$) and overall density ($D_V$).

The IR light is not absorbed by the image (or the dyes), and therefore, if there is no residual silver, the IR-density $D_{IR}$ does not depend on the visible image density but should become a specified density corresponding to the inherent IR-density (IR absorption quantity) that the film F basically contains, that is, draw a straight line (a dotted line C in FIGS. 4A-4D). It can be therefore considered that the minimum line of the IR-density above this dotted line C indicates the IR-density derived from the residual silver.

The pixels of which the IR density is above the minimum line are considered to have dust or scratches on a film, which diffuses the IR light and reduces the quantity of light.

Therefore, the read IR-density $D_{IR}$ can be expressed as the sum of the inherent IR-density C the film F basically contains, the IR-density $D_{Ag}$ due to the residual silver, and the IR-density $D_{de}$ due to the dust adhered to the film or other scratches by using the following equation:

$$D_{IR} = D_{Ag} + D_{de} + C$$

Supposing here that the residual silver exerts an influence upon the IR-density, the same influence should be exerted on the visible image density, i.e., the IR-density (DIR) and the visible image densities ($D_R$, $D_G$, $D_a$, $D_v$) of the same pixel (the same image position) must have a correlation. Further, as explained above, if it is considered that the film has no dust ($D_{de}=0$), $D_{IR}=D_{Ag}+C$. Therefore, the minimum IR-density $D_{IR}$ in an aggregation of pixels exhibiting the same visible image density may be considered to be a sum of the IR-density derived from the residual silver in this visible image density and the inherent IR density C, even if the film has dust.

Accordingly, when the inherent IR-density C plotted by the dotted line C in FIGS. 4A-4D, which is originally contained in the film, is subtracted from the minimum IR-density $D_{IR}$, the IR-density $D_{Ag}$ due to the residual silver can be determined whereby the component of the residual silver existing in the visible image recorded on the film F can be detected.

The pixel having the same visible image densities refers to the pixel in which the respective visible image densities ($D_R$, $D_G$, $D_B$, $D_V$) take the same values. As to the overall density $D_V$, the aggregation of pixels having the same visible image densities may include not only the one in which the overall density $D_V$ is the same but also the one in which the R, G and B densities ($D_R$, $D_G$, $D_B$) are the same, that is, the one only composed of the pixels having the same color densities.

The thus detected residual silver component can be used to correct the visible image data or change processing parameters of the visible image data in the gradation conversion, color (saturation) correction, and (graininess suppression and) sharpness enhancement performed in the image correcting section 54 (described later), whereby adverse effects due to the residual silver remaining in the image on the film F can be corrected to ensure that high quality images are outputted without causing deterioration in the gradation, color reproducibility and graininess as exemplified by the gradation hardening in highlights or decrease in the saturation.

Further, since the deterioration of the processing liquid such as the bleaching liquid and the excessive bleaching process can be detected from the quantity of the detected residual silver components, proper management of the processing liquid used and shortening of the processing time, that is, the time required for development and in particular bleaching can be realized without using any dedicated maintenance tool such as a densitometer in a developing device.

Figure 5:
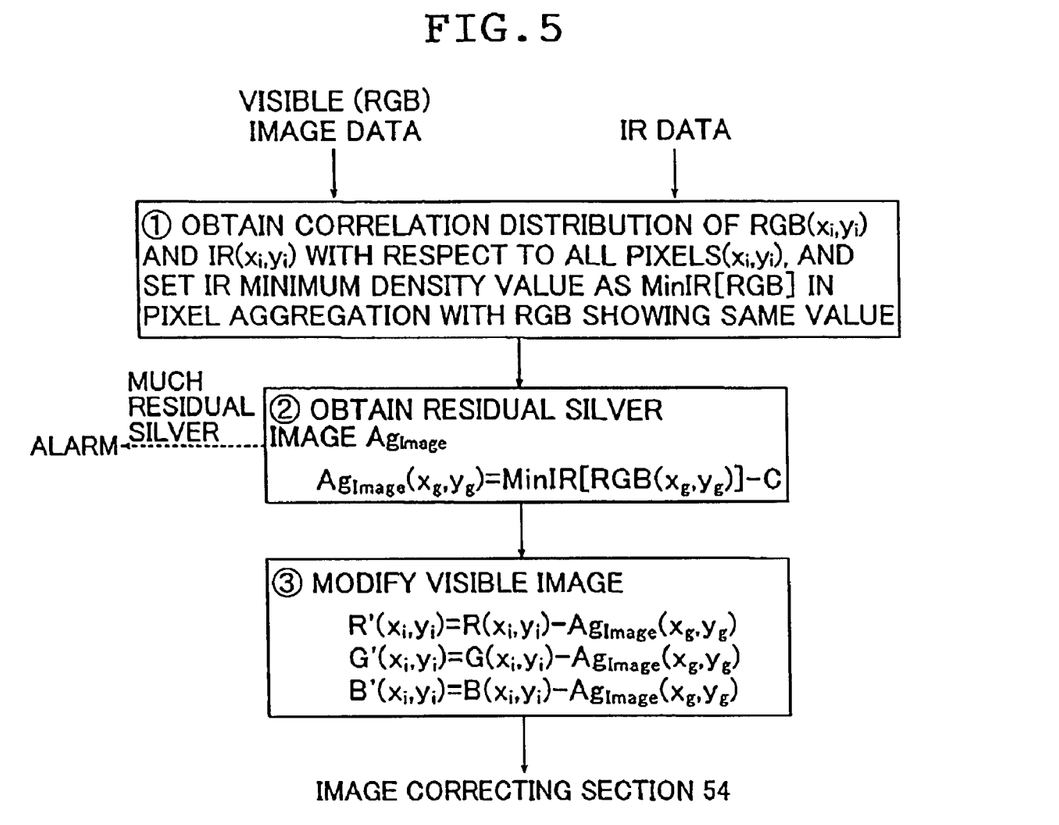
FIG. 5 is an explanatory flowchart showing detection of the residual silver and image correction according to the present invention.

The processing in the residual silver detecting/correcting section 50 will hereinafter be more specifically described with reference to FIG. 5.

As explained above, the residual silver detecting/correcting section 50 reads out both of the visible R-, G- and B-image data and the IR data that have been stored in the FMs 48. First, the residual silver detecting/correcting section 50 determines for all the pixels ($x_i$, $y_i$) a correlational pixel distribution of RGB ($x_i$, $y_i$) defined as the overall visible image data containing all the visible R-, G- and B-images and IR ($x_i$, $y_i$) defined as the IR data as shown in FIG. 4D.

Note that RGB($x_i$, $y_i$) can be given by the above equation, i.e., $D_V = \alpha D_R + \beta D_G + \gamma D_B$, for example.

Next, the residual silver detecting/correcting section 50 detects the minimum IR data in the aggregation of pixels having the same RGB($x_i$, $y_i$), and regards the detected minimum IR data as MinIR[RGB($x_g$, $y_g$)] in this pixel aggregation g. Namely, MinIR[RGB($x_g$, $y_g$)] is a minimum line of the IR density $D_{IR}$ shown in FIG. 4D.

Moreover, after determining MinIR[RGB($x_g$, $y_g$)], the inherent density value C (density value of the IR-density $D_{IR}$ plotted by the dotted line C in FIGS. 4A-4D) defined as the inherent IR-density basically contained in the film F is subtracted from MinIR[RGB($x_g$, $y_g$)], thereby calculating a residual silver image $Ag_{Image}$ ($x_g$, $y_g$).

Namely, this residual silver image is given by:

$$Ag_{Image}(x_g, y_g) = \text{Min}IR[RGB(x_g, y_g)] - C$$

It is to be noted that the residual silver image $Ag_{Image}$ ($x_g$, $y_g$) may be table-formatted for every pixel aggregation g and thus stored, or may be used as a function such as $F[Ag_{Image}(x_g, y_g)]$, corresponding to the total pixel aggregation.

If the value of the residual silver image $Ag_{Image}$ ($x_g$, $y_g$) is larger than a predetermined (threshold) value, the residual silver detecting/correcting section 50 outputs this information (warning) to a control section of the image processing unit 14. The image processing unit 14 having received this information emits an alarming sound and gives an indication on the display 18, thus alarming that the film F contains much residual silver.

The thus determined residual silver image $Ag_{Image}$ ($x_g$, $y_g$) is used as a correction coefficient to subtract the residual silver image $Ag_{Image}$ ($x_g$, $y_g$) of the corresponding pixel aggregation from each of the visible R-, G- and B-image data sets of the respective pixels ($x_i$, $y_i$), thereby obtaining corrected visible image data R' G' and B'. Namely, the data R', G' and B' are given by:

$$R'(x_i, y_i) = R(x_i, y_i) - Ag_{Image}(x_g, y_g)$$

$$G'(x_i, y_i) = G(x_i, y_i) - Ag_{Image}(x_g, y_g)$$

$$B'(x_i, y_i) = B(x_i, y_i) - Ag_{Image}(x_g, y_g)$$

The residual silver detecting/correcting section 50 sends the thus calculated corrected visible image data R', G' and B' to the next image correcting section 54.

In the example given above, the processing is executed by use of the overall image density RGB corresponding to the visible images in full colors. In addition to this, however, the residual silver image $Ag_{Image}$ may be determined for each color, for instance, for the visible image data of each of R, G, and B colors based on a correlation between the visible image data of each color and the IR data so that the visible image data can be corrected likewise.

However, the residual silver affects the image data for every color and involves a large quantity of calculations, and hence it is preferable that the residual silver be detected as in the example given above based on the overall visible image data RGB $(x_i, y_i)$ containing all the data in three primary colors.

As described above, the visible R-, G- and B-image data with the residual silver components corrected by the residual silver detecting/correcting section 50, are subsequently processed in the image correcting section 54.

The image correcting section 54 executes various image processing operations to be done in the digital photoprint system. The image correcting section 54 executes image processing operations including image enlargement/reduction (electronic magnification), sharpening (sharpness enhancement), density correction, color correction (correction of saturation), dodging (expansion/compression of image density dynamic range) and gradation conversion.

According to this example, the residual silver detecting/correcting section 50 corrects the visible image data in accordance with the extracted residual silver components, thereby compensating the adverse influence by the residual silver existing in the image recorded on the film F.

This is not the sole case of the present invention but the adverse influence caused by the residual silver may be corrected in the image correcting section 54 by changing the parameters for image processing such as the gradation conversion, color (saturation) correction and sharpness enhancement (graininess suppression) in accordance with the detected residual silver components and then performing image processing using changed parameters, when only the detection of residual silver components may be performed in the residual silver detecting/correcting section 50, After all, according to the present invention, the visible R-, G- and B-image data may be corrected in either of the residual silver detecting/correcting section 50 and the image correcting section 54.

The correction of the visible image data as such may be carried out such that change, in particular deterioration, in either gradation or color reproducibility or the both due to noise components such as residual silver components is compensated by image processing, or that the intensity of graininess suppression upon image processing is modified or increased in order to compensate change, in particular deterioration, in graininess due to noise components such as residual silver components.

As the correction of the visible image data, the compensation of gradation may be carried out as follows.

Figure 6A:
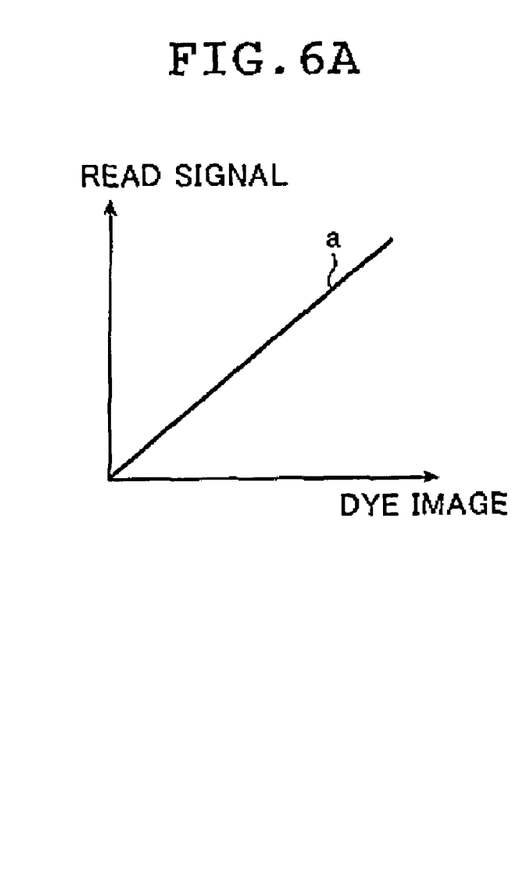
FIGS. 6A, 6B and 6C are explanatory graphs showing how gradation deterioration due to residual silver is compensated according to the present invention.
Figure 6B:
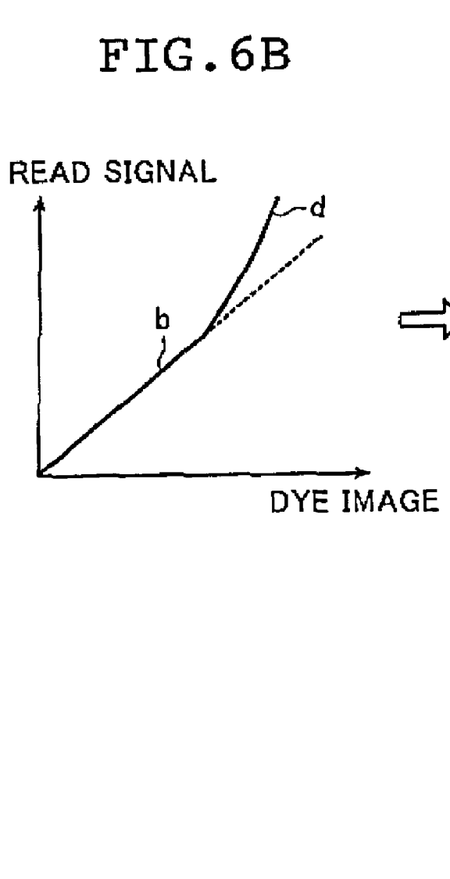

In the case of image reading from a normal image on a film without residual silver, there is a linear relationship (expressed by a linear function) between read signals (image data) and the density of dye images in respective colors of the image on the film, as shown by the graph (straight line) a in FIG. 6A. On the other hand, in the case that residual silver remains in an image, read signals suffer from an influence of the residual silver in the region where the density of dye images is higher, as shown by the graph (curve) b in FIG. 6B. Specifically, the linear relationship is lost and the graph b deviates from the linear graph (straight line) a upward so that the values of the read signals become larger than the normal ones, resulting in gradation hardening. The part of the graph b deviating from the linear graph a upward is the increment d caused by residual silver, as described before.

In order to eliminate the increment d caused by residual silver, therefore, as described before, a curve such as the graph c in FIG. 6C having characteristics reverse to those of the graph b may be used as a correction curve (correction table) for read signals (image data) to thereby obtain corrected signals (corrected image data).

Figure 6C:
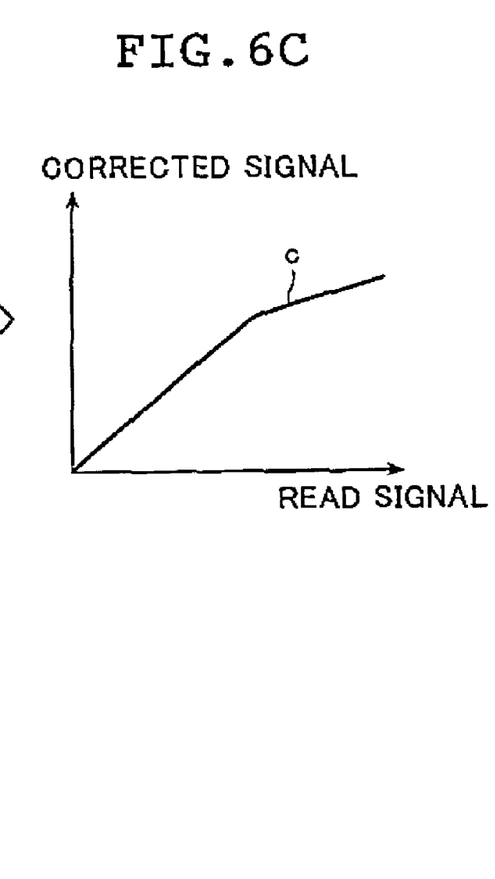

Thus, the corrected signals (image data) with values equivalent to those of normal read signals, that get rid of the influence of residual silver components, can be obtained.

As described before, the compensation of gradation may be carried out in either of the residual silver detecting/correcting section 50 and the image correcting section 54. In the latter, the compensation of gradation may be realized by density correction or gradation conversion.

If the compensation of color reproducibility is to be carried out as the correction of the visible image data, the decrease in saturation is compensated by saturation enhancement by matrix processing. For instance, the corrected image data getting rid of the influence of the decrease in saturation due to residual silver can be obtained in the image correcting section 54 by matrix processing for correcting color or saturation, in which the intensity of saturation enhancement as a processing parameter is increased to subject the not-corrected image data to matrix processing for saturation enhancement. The compensation of color reproducibility may also be carried out in the residual silver detecting/correcting section 50 instead of the image correcting section 54.

It is also possible to carry out the compensation of deterioration in graininess due to the residual silver components as the correction of the visible image data. In that case, the corrected image data getting rid of the influence of the deterioration in graininess due to residual silver can be obtained, for instance, in the image correcting section 54 by increasing the intensity of graininess suppression (or even decreasing the sharpening intensity) upon sharpening processing (sharpness enhancement), or again, performing processing for graininess suppression with the intensity of graininess suppression made higher. Naturally, the compensation of graininess may also be carried out in the residual silver detecting/correcting section 50 instead of the image correcting section 54.

The visible image data having been subjected to various image processing operations in the image correcting section 54, are outputted to the data converting section 58.

The data converting section 58 uses for example a three-dimensional (3D)-LUT to convert the visible image data into image data for output suited to print outputting from the printer 22, and outputs the thus converted image data to the printer 22.

Note that the visible image data processed in the image correcting section 54 may be converted into a variety of image formats, e.g., a JPEG (Joint Photographic Experts Group)-formatted image file, and this image file may be outputted to a recording medium such as a CD-R or an MD (mini disk) or both of the print and the image file may also be outputted in the print system 10.

The printer 22, which is a known color printer, scan-exposes a sheet of photographic printing paper two-dimensionally to the laser beams modulated in accordance with the supplied R-, G- and B-image data for output, to record a latent image thereon. The thus exposed photosensitive material is then subjected to a wet development process including color development, fixing and rinsing to render the latent image visible. The thus processed photosensitive material is then dried to produce a print to be output.

In the above embodiment, correcting the visible image and giving an alarm indicating that there is a large quantity of residual silver are both performed in accordance with the detected residual silver. However, this is not the sole case of the present invention and any one of correcting the visible image and giving the alarm may also be performed. Alternatively, the detected residual silver quantity may be only outputted or may be outputted in combination with other processing.

Further, in the above embodiment which is intended for reading of images on a film, noise components such as residual silver are detected and declines of image quality due to the noise components are even corrected. The present invention is, however, not restricted to this mode and may suitably be applied to reading of images on an image recording medium such as photographic printing paper.

Moreover, in the above embodiment intended for reading of images on an image recording medium, noise components such as residual silver are detected and declines of image quality due to the noise components are even corrected. It is assumed that this is not the sole case of the present invention but the present invention may be applied to detecting and correcting of an image defect attributed to dust or scratches. If dust or scratches are to be detected, the IR-density $D_{de}$ due to dust or scratches may be found by subtracting the IR-density $D_{Ag}$ due to residual silver from the read IR-density $D_{IR}$ to determine the presence of dust or scratches based on the value of the IR-density $D_{de}$ thus found. For instance, the pixel with an IR-density $D_{de}$ higher than the predetermined threshold may be determined as having dust or scratches.

To be more specific, as represented by the formula below in the embodiment as described above, corrected IR-image data $IR'(x_i,y_i)$ may be found by subtracting residual silver image $Ag_{image}(x_g,y_g)$ from IR-image data $IR(x_i,y_i)$ read from a pixel (xi,yi) to determine based on the corrected IR-image data $IR'(x_i,y_i)$ thus found whether or not the pixel has dust or scratches.

$$IR'(x_i,y_i)=IR(x_i,y_i)-Ag_{image}(x_g,y_g)$$

In case that the pixel having dust or scratches has been detected, the visible image in question or the visible R-, G- and B-image data thereof be corrected using the address information of the pixel so as to have the image regarded as free from the dust or scratches. The method for correcting the visible image having dust or scratches is not limited to particularly but any of various known methods including correction by means of interpolation and correction utilizing the sequentiality of pixels may be available.

The image reader and the image reading method according to the present invention have been described in detail so far. The present invention is not, however, limited to the embodiment discussed above and may be, as a matter of course, improved and modified in various ways within the range of the invention without departing from the concept of the invention.

As discussed above in detail, the image reader and the image reading method of the present invention for photoelectrically reading an image or the like photographed or recorded on an image recording medium such as a film and photographic printing paper make it possible to properly detect unwanted components including an image-forming intermediate product such as a silver component and an impurity remaining in the image.

Hence, according to the present invention, a high-quality image having no deterioration in gradation or color reproducibility such as the increase in gradation hardness in the high-density portion of the image and the decrease in saturation, or again, no deterioration in graininess, such deteriorations all caused by unwanted components such as residual silver, can be outputted by correcting the image data in accordance with the detected unwanted components such as residual silver. Further, the state of the processing liquid is grasped in accordance with the detected residual silver and the like, whereby maintenance of the developing device can be properly carried out.

According to the present invention, in addition, it is possible to shorten time to subject a silver halide photosensitive material such as a film and photographic printing paper to the processing in a developing device, namely time for development and in particular bleaching, and to allow margin for the processing conditions for the developing device.

What is claimed is:

1. An image reader photoelectrically reading an original image including a visible image and an invisible image, comprising:
    an image reading device for reading said original image with visible light and invisible light; and
    a detecting unit which generates correlational pixel distribution information based on visible light signals and invisible light signals read by said image reading device and detects noise components in said original image by use of said pixel distribution information,
    wherein said noise components are silver components remaining in said original image.

2. The image reader according to claim 1, wherein said noise components are unwanted components other than image components in said original image which are caused by either an image-forming intermediate product or an impurity or both in an image recording medium carrying said original image thereon.

3. The image reader according to claim 1, wherein said image reading device reads said visible image of said original image by reading said visible light in three primary colors of red, green and blue, and said detecting unit generates said pixel distribution information by use of weighted visible light signals obtained by performing a weighting operation in which predetermined weighting is carried out with respect to each of said three primary colors of red, green and blue.

4. The image reader according to claim 3, wherein said weighted visible light signals are obtained by performing the weighting operation with decreasing weight in order of red, green and blue of said three primary colors.

5. The image reader according to claim 1, further comprising: a correcting unit which generates correction information with said visible light signals as parameters in accordance with said noise components detected by said detecting unit and corrects said visible light signals read by said image reading device with an aid of said correction information.

6. The image reader according to claim 5, wherein said correcting unit corrects said visible light signals such that change in gradation or color reproducibility or both due to said noise components are compensated by image signal processing.

7. The image reader according to claim 5, wherein said correcting unit corrects said visible light signals such that an intensity of graininess suppression upon image signal processing is modified in order to compensate change in graininess due to said noise components.

8. The image reader according to claim 5, wherein said correcting unit generates said correction information on a basis of said invisible light signals exhibiting a minimum density in an aggregation of pixels which are identical to one another in said visible light signals relating to them.

9. The image reader according to claim 1, further comprising: an alarming device for giving an alarm when a quantity of said noise components detected by said detecting unit exceeds a predetermined value.

* * * * *